(12) United States Patent
Niimi

(10) Patent No.: US 8,250,208 B2
(45) Date of Patent: Aug. 21, 2012

(54) NETWORK DEVICE, METHOD FOR SPECIFYING INSTALLATION POSITION OF NETWORK DEVICE, AND NOTIFICATION DEVICE

(75) Inventor: Tomoharu Niimi, Aichi (JP)

(73) Assignee: Buffalo Inc., Nagoya-shi (JP)

( * ) Notice: Subject to any disclaimer, the term of this patent is extended or adjusted under 35 U.S.C. 154(b) by 417 days.

(21) Appl. No.: 12/399,524

(22) Filed: Mar. 6, 2009

(65) Prior Publication Data

US 2009/0282145 A1    Nov. 12, 2009

(30) Foreign Application Priority Data

Mar. 7, 2008   (JP) ................ P2008-058165
Feb. 19, 2009  (JP) ................ P2009-036300

(51) Int. Cl.
*G06F 15/173* (2006.01)
(52) U.S. Cl. .................................... 709/224
(58) Field of Classification Search .......... 709/224
See application file for complete search history.

(56) References Cited

U.S. PATENT DOCUMENTS

| | | | | |
|---|---|---|---|---|
| 6,501,754 | B1 * | 12/2002 | Ohba et al. | 370/389 |
| D527,664 | S * | 9/2006 | Beadle et al. | D10/97 |
| 7,266,599 | B2 * | 9/2007 | Schuster | 709/223 |
| 7,379,426 | B2 * | 5/2008 | Sekiguchi | 370/241 |
| 7,752,666 | B2 * | 7/2010 | Jayawardena et al. | 726/23 |
| 8,019,847 | B2 * | 9/2011 | Banks et al. | 709/223 |
| 2002/0176370 | A1 * | 11/2002 | Ohba et al. | 370/252 |
| 2003/0021235 | A1 * | 1/2003 | Arima | 370/244 |
| 2004/0117475 | A1 * | 6/2004 | Taylor et al. | 709/224 |
| 2004/0227639 | A1 | 11/2004 | Masui | |
| 2005/0089027 | A1 * | 4/2005 | Colton | 370/380 |
| 2006/0285499 | A1 * | 12/2006 | Tzeng | 370/249 |
| 2007/0036308 | A1 * | 2/2007 | Mallya et al. | 379/114.04 |
| 2007/0153763 | A1 * | 7/2007 | Rampolla et al. | 370/351 |
| 2007/0280238 | A1 * | 12/2007 | Lund | 370/392 |
| 2008/0177876 | A1 * | 7/2008 | Gava et al. | 709/224 |
| 2009/0161567 | A1 * | 6/2009 | Jayawardena et al. | 370/252 |
| 2009/0180401 | A1 * | 7/2009 | Guan | 370/255 |

FOREIGN PATENT DOCUMENTS

| | | |
|---|---|---|
| CN | 1885799 A | 12/2006 |
| JP | 3-9277 | 1/1991 |
| JP | 6-244841 | 9/1994 |
| JP | 2000-49846 | 2/2000 |
| JP | 2002-290414 | 10/2002 |
| JP | 2002-305521 | 10/2002 |
| JP | 2004-339700 | 12/2004 |
| JP | 2005-117567 (A) | 4/2005 |
| JP | 2006-135950 | 5/2006 |
| JP | 2007-124184 | 5/2007 |

OTHER PUBLICATIONS

Chinese Office Action issued May 25, 2011, in Patent Application No. 200910008771.4 (with English-language translation).

* cited by examiner

*Primary Examiner* — Jerry Dennison
(74) *Attorney, Agent, or Firm* — Oblon, Spivak, McClelland, Maier & Neustadt, L.L.P.

(57) ABSTRACT

A network device, method for specifying installation position of network device, and notification device are provided. The network device includes: a loop detecting unit configured to detect a loop caused by the network device; and a location notifying unit configured to allow the network device itself to indicate a location of the network device in response to a detection of the loop.

12 Claims, 10 Drawing Sheets

NETWORK DEVICE, METHOD FOR SPECIFYING INSTALLATION POSITION OF NETWORK DEVICE, AND NOTIFICATION DEVICE

CROSS-REFERENCE TO RELATED APPLICATIONS

This application is based on and claims the priority from Japanese Patent Application No. 2008-058165 filed on Mar. 7, 2008 and Japanese Patent Application No. 2009-036300 filed on Feb. 19, 2009, the entire contents of which are incorporated herein by reference.

TECHNICAL FIELD

The present invention relates to a network device configured to exchange data via a network.

BACKGROUND

A network device, such as switching hub, is used in a local area network to interconnect a plurality of nodes. Since the network device is not operated daily, the network device is located at a less visible place such as between desks in an office or under a floor of the office. When the network configuration is changed or a countermeasure at a time of trouble is carried out, it is necessary to specify a target network device on site, but it is not easy to find the target network device located at such place.

Further, a connection in a local area network may be made erroneously. For example, both ends of a cable are connected to a same network device, or a connection is made to flow data circularly. It may cause a loop in which a broadcast frame or a frame having an unknown address permanently circulates in the network, which may cause the network down. In order to clear the loop, a network administrator specifies a network device causing the loop, and then visits the site and clears an incorrect connection of the network device. As an example of a method for specifying the network device causing the loop, the network administrator may send a predetermined command from an administration computer and specifies an IP address of the network device causing the loop. Also, JP-A-2007-124184 describes a method and device for detecting the loop. However, as described above, since it is difficult to specify a network device on site, it takes much time to specify the network device. Therefore, network trouble due to the loop cannot be quickly restored.

SUMMARY

The present invention was made in consideration of the above-described circumstances, and an object thereof is to easily specify an installation location of a network device.

According to a first aspect of the invention, there is provided a network device comprising: a loop detecting unit configured to detect a loop caused by said network device; and a location notifying unit configured to allow said network device itself to indicate a location of said network device in response to a detection of the loop.

According to a second aspect of the invention, there is provided a method for specifying a location of a network device connected to a network, said method comprising: detect a loop caused by said network device; and allowing said network device itself to indicate a location of said network device in response to a detection of the loop.

According to a third aspect of the invention, there is provided a notification device connectable to a network device, said notification device comprising: a loop detecting unit configured to detect a loop caused by the network device; and a location notifying unit configured to allow the notification device itself to indicate a location of said network device in response to a detection of the loop.

DESCRIPTION

Exemplary embodiments of the present invention will be described.

A. Embodiment 1

A-1. Outline of Network Configuration

Figure 1:
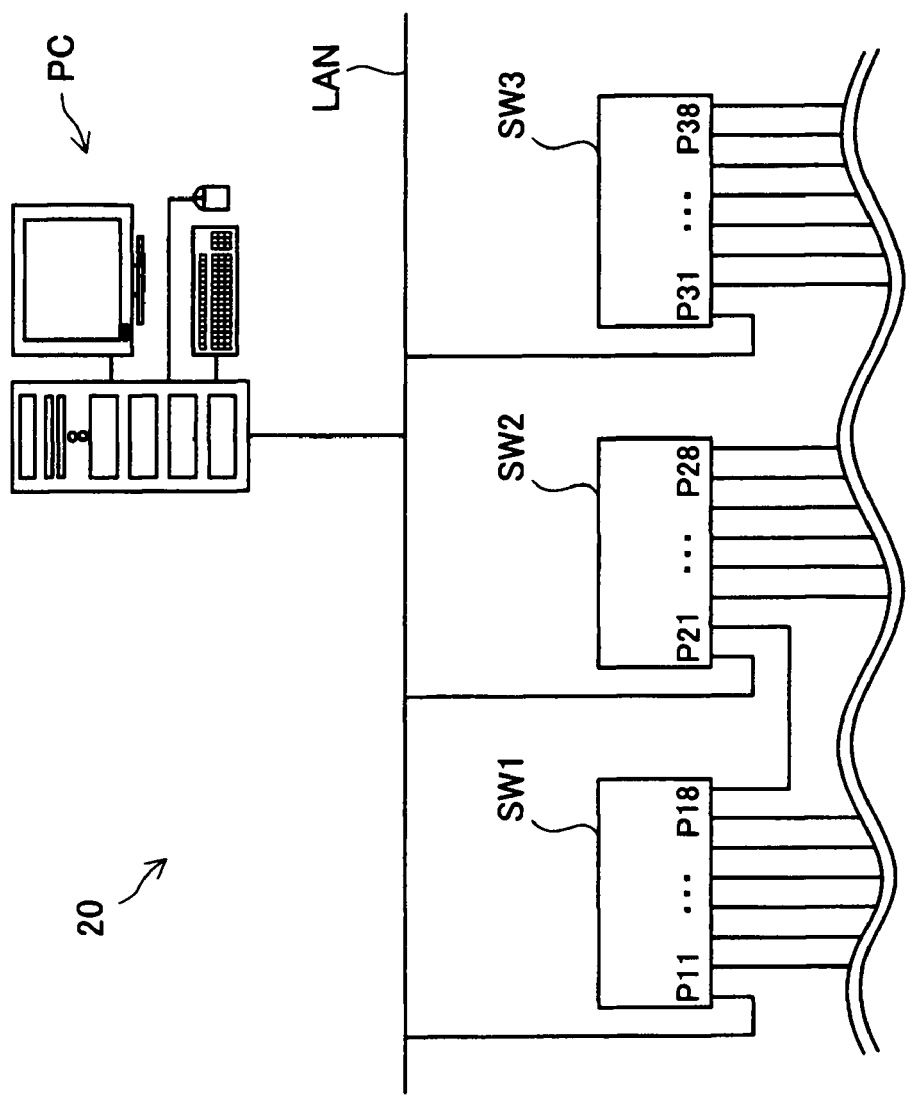
FIG. 1 is a schematic view showing a brief configuration of a network system 20 according to an embodiment of the present invention.

FIG. 1 is a schematic view showing a brief configuration of a network system 20 according to an embodiment of the present invention. In the network system 20, an administration computer PC and network devices SW1 through SW3 are interconnected via a local area network LAN. The administration computer PC is a computer capable of administrating the local area network LAN. The administration computer PC includes a display, a keyboard and a mouse.

The network device SW1 is a switching hub configured to exchange frames based on MAC address information in a data link layer and includes ports P11 through P18. The network devices SW2 and SW3 are similar to the network device SW1, and include ports P21 through P28 and ports 31 through P38, respectively.

The port P11 of the network device SW1, port P21 of the network device SW2 and port P31 of the network device SW3 are connected to a main line of the local area network LAN. The ports P12 through P17 of the network device SW1, ports P23 through P28 of the network device SW2 and ports P32 through P38 of the network device SW3 are connected to terminals (not shown).

In addition, the port P18 of the network device SW1 is connected to the port P22 of the network device SW2 by a single cable. This connection generates a loop in which a MAC frame circulates between the network devices SW1 and SW2. Also, each of the network devices SW1 through SW3 has an AUTO-MDIX feature which automatically recognizes a connection destination and selects one of MDI (Medium Dependent Interface; straight connection terminal) and MDIX (Medium Dependent Interface Crossover; cross connection terminal).

A-2. Outline of Network Device

Figure 2:
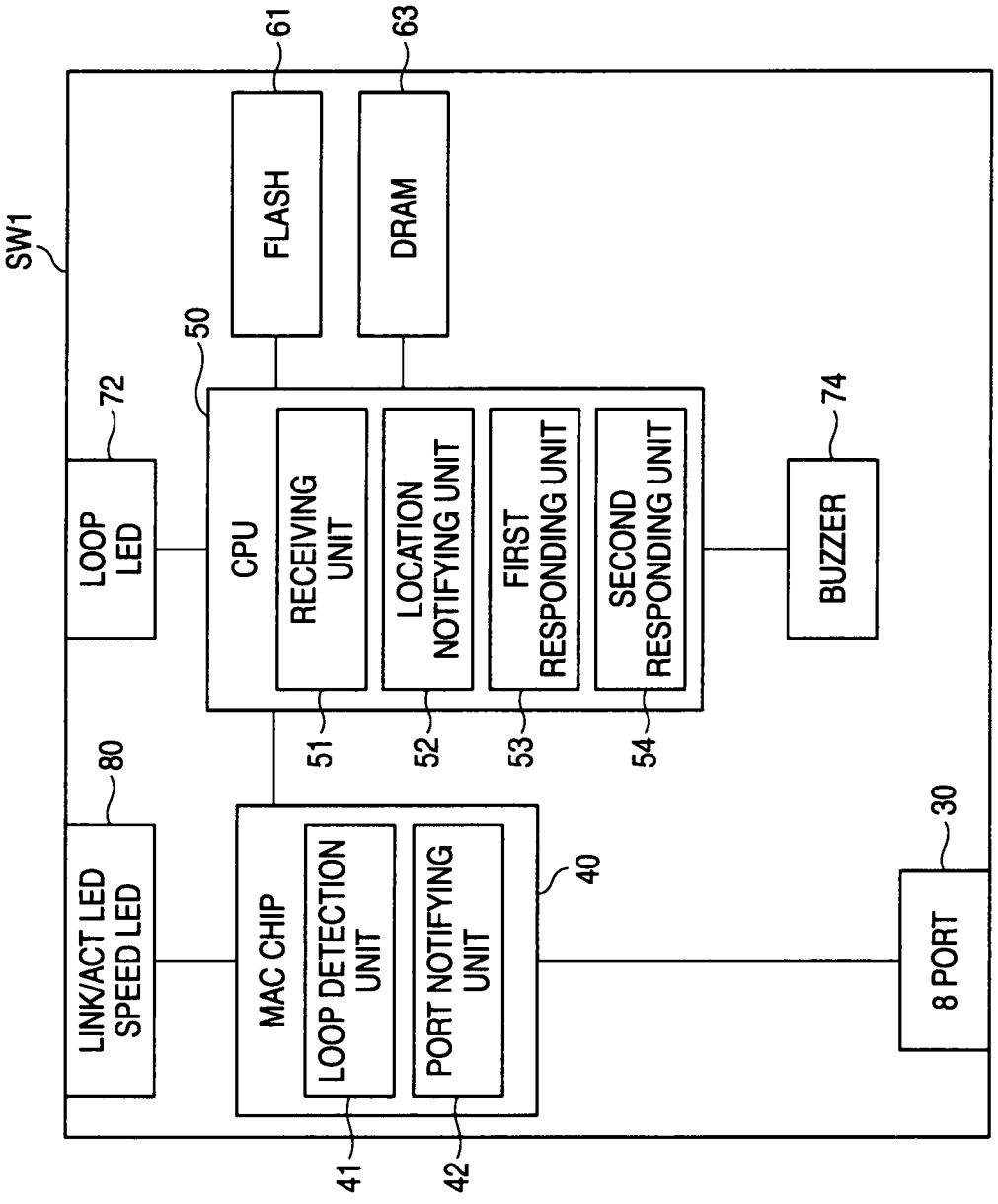
FIG. 2 is a schematic view showing a brief configuration of a network device.

FIG. 2 shows a brief configuration of the network device SW1 shown in FIG. 1. Since the brief configuration of the network devices SW2 and SW3 is similar to that of the network device SW1, the description thereof is omitted. The network device SW1 includes a port portion 30, a MAC chip 40, a CPU 50, a flash memory 61, a DRAM 63, a loop display LED 72, a buzzer 74 and a link display LED portion 80.

The port portion 30 includes eight ports having the AUTO-MDIX feature, but the number of ports is not specially limited thereto, for example, the port portion 30 may include four ports or sixteen ports.

The MAC chip 40 includes a DSP (Digital Signal Processor) configured to retrieve a MAC frame from a received signal from the port portion 30 and sends the MAC frame to a port corresponding to the MAC address with reference to a dynamic address table. The MAC chip 40 also functions as a loop detection unit 41 and a port notifying unit 42, which relate to Embodiment 2 described later. Also, the MAC chip 40 internally incorporates a PHY chip to rectify the waveform of signals received from the port portion 30 in the present embodiment. A detailed description of the function as the loop detection unit 41 will be given later. Further, the MAC chip 40 includes: an area for storing a dynamic address table in which the MAC address of terminals on the local area network LAN and the respective port numbers corresponding thereto are stored after being associated with each other; and a buffer area for temporarily storing the MAC frame.

The CPU 50 controls the MAC chip 40. The CPU 50 also functions as a receiving unit 51, a location notifying unit 52, the first responding unit 53, and the second responding unit 54 based on programs stored in a flash memory 61. A detailed description thereof will be given later.

The loop display LED 72 flashes for notifying the installation location of the network device SW1 and for notifying the detection of a loop by means of the loop detection unit 41. The buzzer 74 notifies of the installation location of the network device SW1 in a predetermined case. The link display LED portion 80 indicates a linked state of ports P11 through P18 in the port portion 30, a data transmission and receiving state, and transfer rate. The loop display LED 72 and the buzzer 74 may be connected to the MAC chip 40.

Figure 3:
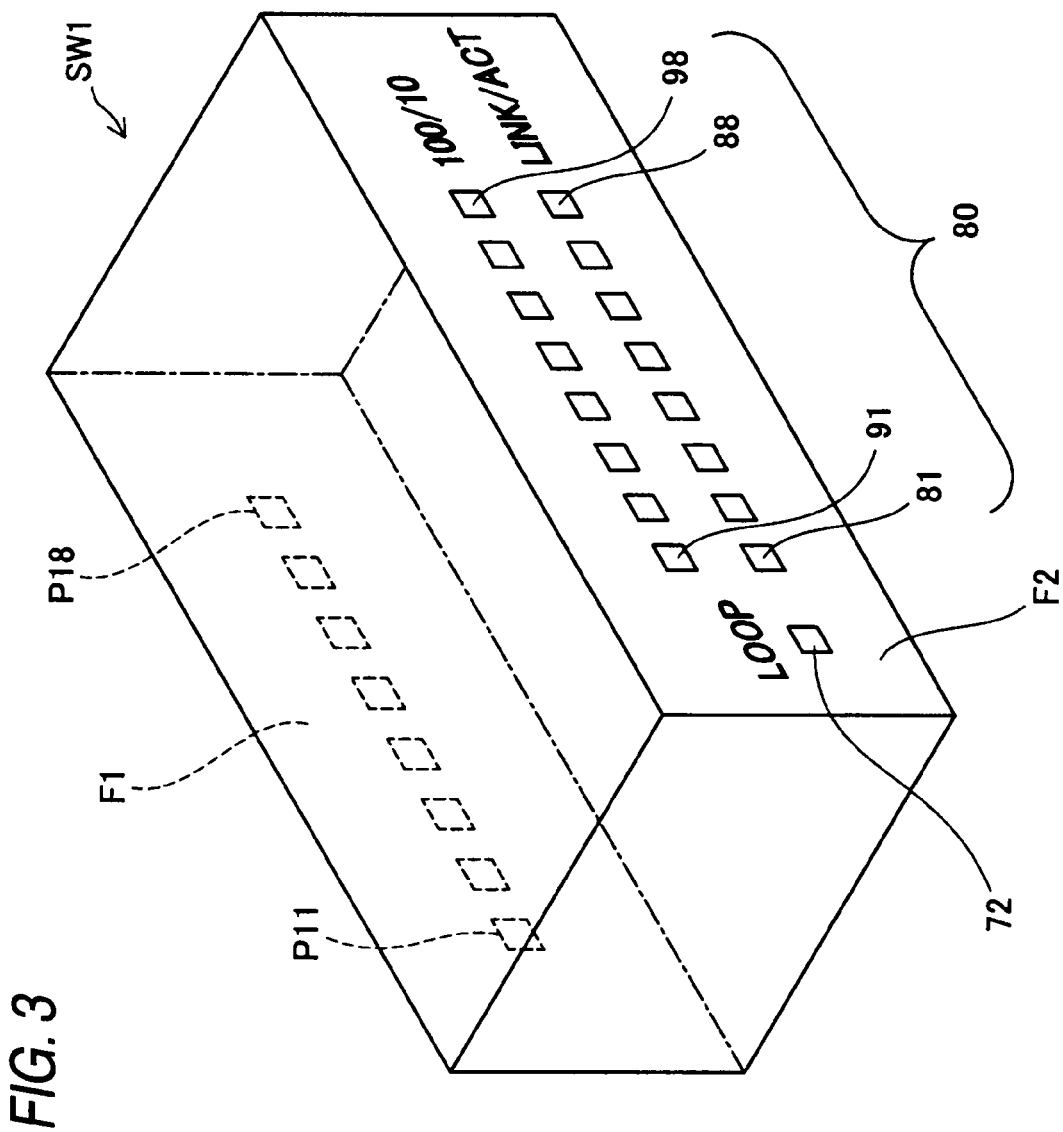
FIG. 3 is a schematic view showing the appearance of the network device.

An external view of the network device SW1 is shown in FIG. 3. The network device SW1 includes side surfaces F1 and F2. The side surface F1 is provided with ports P11 through P18. The side F2 is provided with the loop display LED 72 and the link display LED portion 80. The link display LED portion 80 includes: link/act LEDs 81 through 88 showing a linked state of respective ports; and speed LEDs 91 through 98 showing the transfer rate of the respective ports. Normally, the link/act LEDs 81 through 88 are lit (turned on) when the corresponding ports P11 through P18 are in a linked state, and flashes during data transmission and data reception. In addition, when the loop display LED 72 is caused to flash in response to the detection of the loop, only the LED corresponding to a port contributing to the loop flashes. The speed LEDs 91 through 98 are lit when the transfer rate of the corresponding ports P11 through P18 is 100 Mbps, and flashes when the transfer rate is 10 Mbps.

A-3. Outline of Loop Notifying Process of a Network Device

A loop notifying process of a network device in the network system 20 according to the first embodiment is described with reference to FIG. 4.

Figure 4:
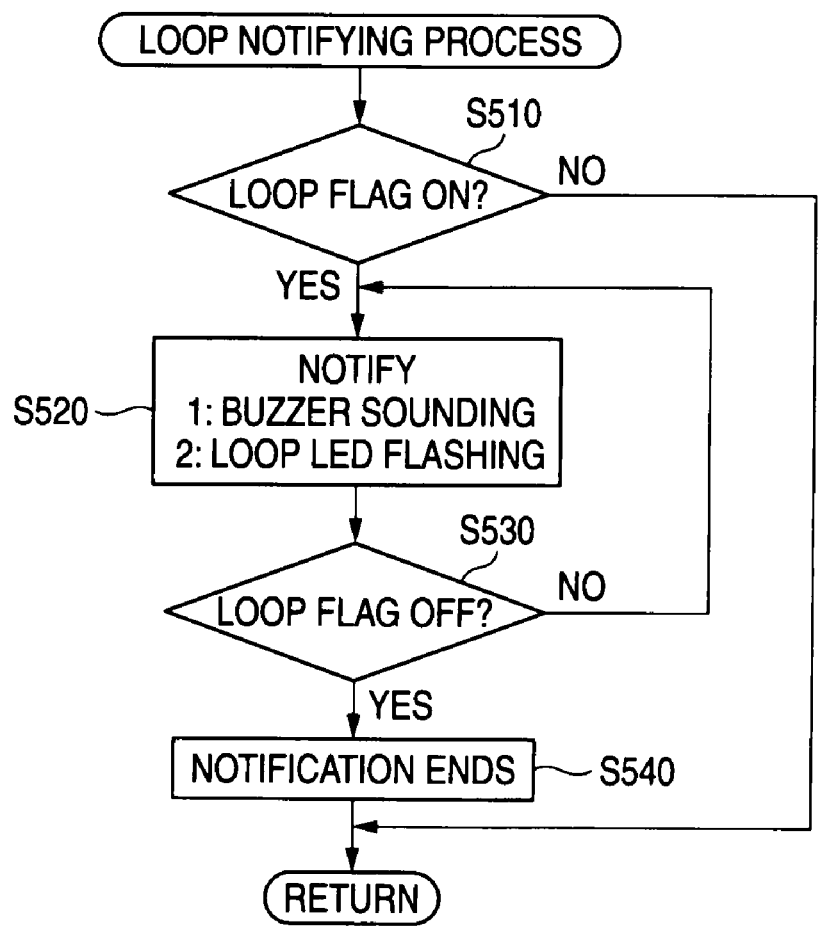
FIG. 4 is a flowchart showing a flow of a loop notifying process.

FIG. 4 shows a loop notifying process in the network device SW1 according to Embodiment 1 of the present invention. The loop notifying process is a process in which the network device SW1 detects existence of a loop via the network device SW1 and notifies of the same.

Figure 5:
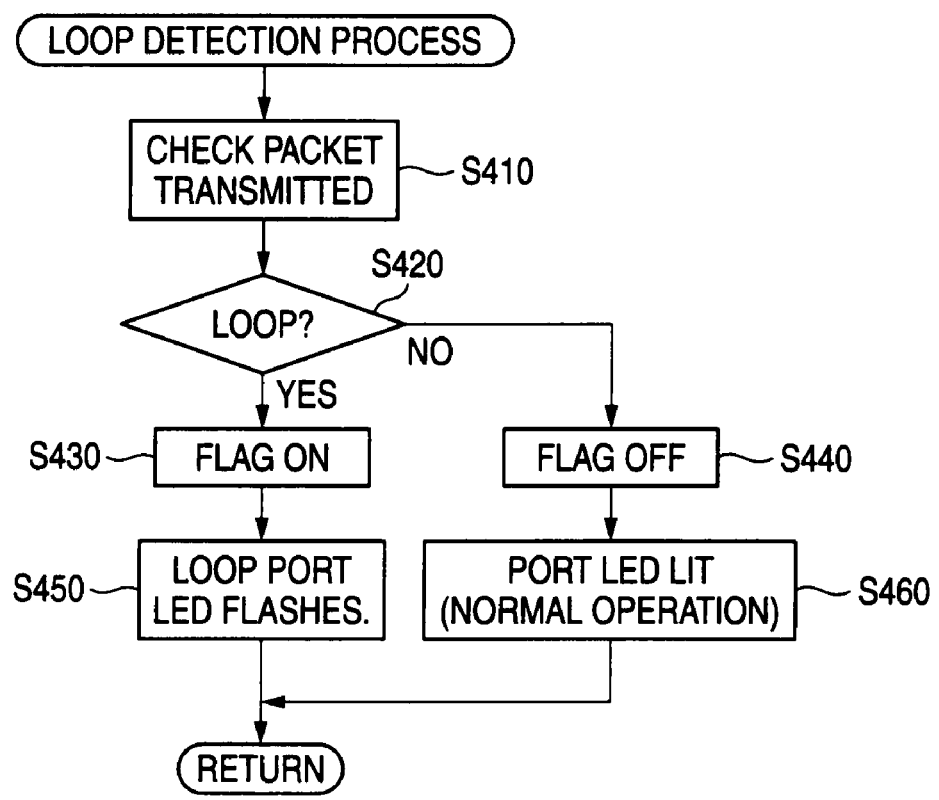
FIG. 5 is a flowchart showing a flow of a loop detecting process.

When a loop notifying process is initiated, the CPU 50 of the network device SW1 determines whether a loop flag of a register provided in the MAC chip 40 is set ON (Step S510). The loop flag is described in detail with reference to FIG. 5. FIG. 5 is a flowchart showing flows of a loop detecting process executed by the MAC chip 40.

The MAC chip 40 has a function for detecting a loop via the network device SW1 as a process of the loop detection unit 41. When a loop is detected, a loop flag is raised (set ON) in the register. In detail, first, the MAC chip 40 transmits a loop check packet to the ports P11 through P18 by broadcasting (Step S410). The MAC chip 40 determines whether a loop occurs (Step S420). Specifically, the MAC chip 40 determines whether the transmitted packet is returned to the network device SW1 based on the MAC address of a transmission source contained in the packet or based on information in the inside of the packet. If the network device SW1 receives a transmitted packet within a predetermined period of time, it means that a loop has occurred at the network device SW1, and if not received, it means that no loop has occurred.

If a loop occurs (Step S420: YES), the MAC chip 40 sets the loop flag ON of the register thereof (Step S430). The MAC chip 40 flashes any one of the link/act LEDs 81 through 88, which corresponds to the port that received a loop detecting packet, as a process of the port notifying unit 42 (Step S450).

On the other hand, if no loop occurs (Step S420: NO), the MAC chip 40 sets the loop flag OFF (Step S440), and lights the link/act LEDs 81 through 88 corresponding to a port that is in a linked state as a normal operation (Step S460). In the present embodiment, the loop detecting process is periodically carried out (herein, once every 15 seconds).

Returning to FIG. 4, if the loop flag is set OFF according to the result with reference to the loop flag of the register of the MAC chip 40 (Step S510: NO), the CPU 50 returns the loop notifying process since no loop occurs. On the other hand, if the loop flag is set ON (Step S510: YES), the loop occurs, and the CPU 50 sounds the buzzer 74 and flashes the loop display LED 72 as a process of the location notifying unit 52 (Step S520).

The CPU 50 determines again whether the loop flag is set OFF (Step S530). If the loop flag is set ON (Step S530: NO), it means that the loop is not cleared. Accordingly, the CPU 50 continues the notifying process of Step S520. On the other hand, if the loop flag is set OFF (Step S530: YES), it means that the loop is cleared. Accordingly, the CPU 50 terminates the notifying process of Step S520 (Step S540), and returns the process.

In the present embodiment, the installation location of the network device SW1 is notified by using three notifying methods shown in Step S520 of FIG. 4 and Step S450 of FIG. 5. However, only one or two notifying methods thereof may be used.

When the MAC chip 40 detects existence of a loop, the network device SW1 notifies the installation location of the network device SW1 by sounding the buzzer 74 and flashing the loop display LED 72. Therefore, the user can easily specify the installation location of the network device SW1 generating the loop. Accordingly, since the user can recognize the installation location of the network device SW1 that generates a loop, the user can quickly carry out a loop clearing work.

Since network device SW1 can audibly notify of the installation location of the network device SW1 by sounding the buzzer 74, the network device SW1 generating the loop can be easily specified even when the network device SW1 is located at a less visible location such as under a floor. Further, since the network device SW1 can visually notify the installation location of the network device SW1 by flashing the loop display LED 72, the network device SW1 generating the loop can be easily specified even when it is difficult to distinguish the network device only by the visual indication, for example, when a plurality of network devices are collectively installed along with the network device SW1.

Also, since the network device SW1 flashes any one of the link/act LEDs 81 through 88 corresponding to the port contributing to the loop, the user easily specifies the port contributing to the loop and can quickly carry out a loop clearing work.

Further, since the network device SW1 periodically detects the loop and notifies it if any loop is detected, the user can recognize any incorrect connection on site if the user makes any incorrect connection causing the loop. Therefore, since the user who made the incorrect connection can clear the incorrect connection, it is possible to relieve the burden given to the network administrator. Therefore, it is not necessary to carry out any countermeasure after a serious difficulty occurs.

B. Embodiment 2

Figure 6:
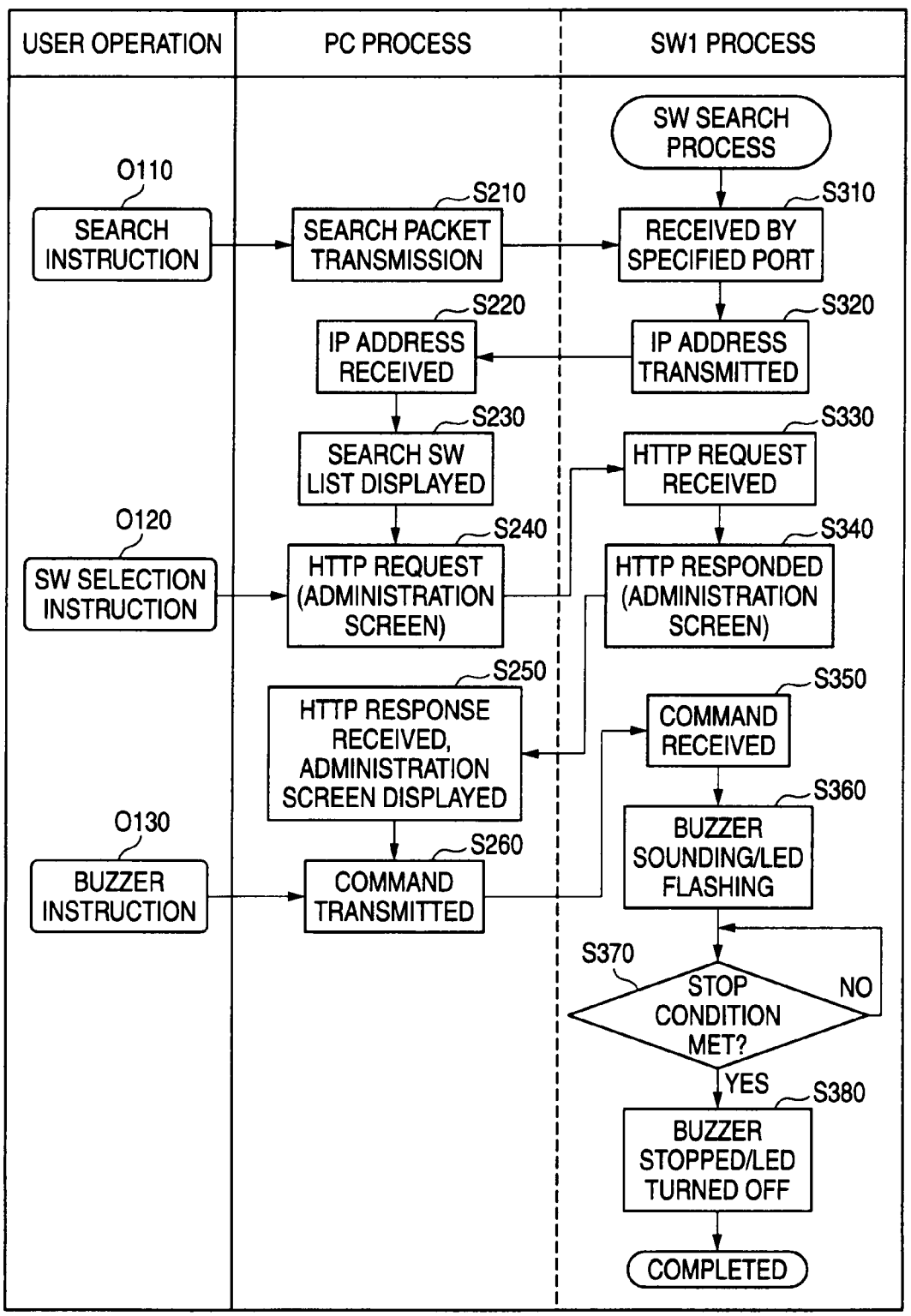
FIG. 6 is a flowchart showing a flow of a search process of a network device according to a second embodiment.

Embodiment 2 of the present invention is hereinafter described. A brief configuration of the network system 20 according to Embodiment 2 and a brief configuration of the network device SW1 according thereto are similar to those of Embodiment 1. Therefore, the description thereof is omitted. FIG. 6 shows a search process in the network device SW1 according to Embodiment 2 of the present invention. The search process is a process for specifying the installation location of a network device SW1 on site, for example, when changing the connection address of the port portion 30 of the network device SW1.

In the present embodiment, the search process of a network device is initiated in response to an instruction of the search process of a network device which is input by the user via the keyboard, etc., of the administration computer PC (Operation O110). If the instruction is input, the administration computer PC transmits a search packet of a network device on a local area network LAN by broadcasting (Step S210).

On transmitting the search packet by the administration computer PC, the CPU 50 of the network device SW1 receives the search packet at a specific port as a process of the first responding unit 53 (Step S310). The CPU 50 can recognize that a network device is searched on the receipt of the search packet. In response to the receipt of the search packet, the CPU 50 transmits an IP address, MAC address and name of the network device SW1 as a process of the first responding unit 53 (S320) to the administrator computer PC. In addition, the network devices SW2 and SW3 make a response similar to that of SW1. The communications are achieved, for example, by SNMP (Simple Network Management Protocol). In the present embodiment, the network device SW1 is configured to send the IP address, MAC address and name, but the information included in the response may be information that can distinguish the network device SW1 on the LAN (i.e., identification information assigned to the network device SW1), for example, only the IP address may be acceptable.

On the other hand, as the administration computer PC receives the responses of the network devices SW1 through SW3 (S220), the administration computer PC displays a list of network devices on the display regarding the network devices of which the response received by the administration computer PC (Step S230). A user confirms the list and uses the keyboard, and input an instruction to select the network device SW1, the installation location of which is desired to be specified (Operation O120).

When the administration computer PC receives the selection instruction of the network device SW1, the administration computer PC transmits an http request to the network device SW1 (Step S240). The http request includes a request for data to display an administration screen through the WEB browser of the administration computer PC. The administration screen allows an input for operation instructions to the network device SW1.

When the CPU 50 of the network device SW1 receives the http request from the administration computer PC (Step S330) the CPU 50 transmits an http response which outputs administration screen data stored in the flash memory 61 as a process of the second responding unit 54 (Step S340).

Figure 7:
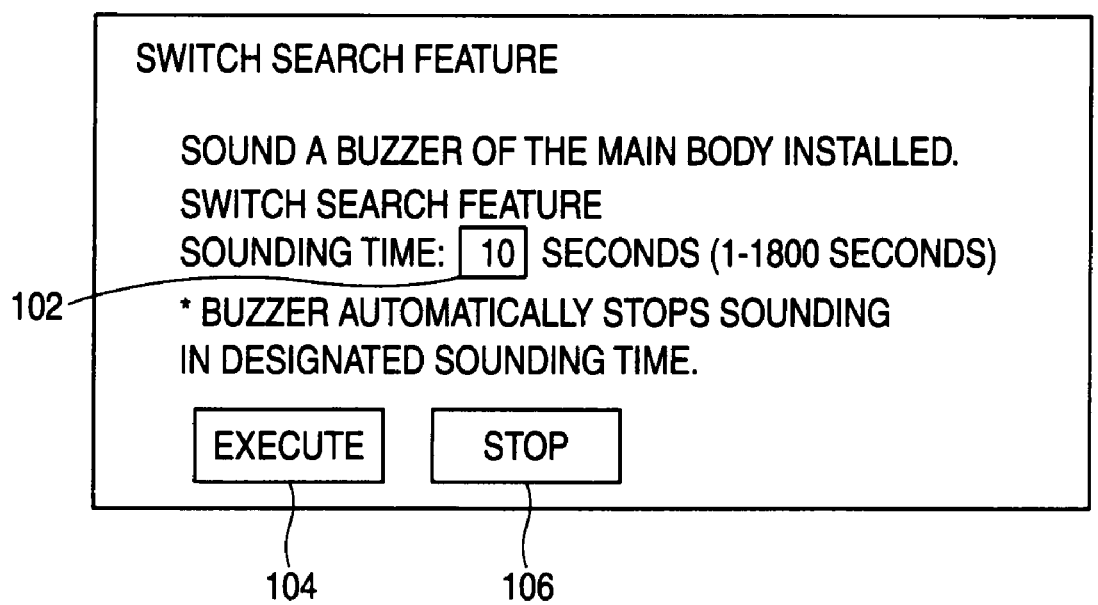
FIG. 7 is a schematic view showing one example of an administration screen of the network device.

When the administration computer PC receives the http response from the network device SW1, and the administration computer PC causes the WEB browser to display an administration screen (Step S250). One example of the administration screen is shown in FIG. 7. The administration screen allows an input for an operation instruction to the network device SW1. The operation instruction is to, sound the buzzer 74 of the network device SW1. The administration screen includes an input box 102 for entering a sounding period of time (1 second through 1800 seconds). In addition, by clicking an execution button 104 using the mouse, a buzzer sounding command is transmitted to the network device SW1. The buzzer sounding command is to sound the buzzer 74 for the period of time specified by the input. By clicking the stop button 106, a sounding stop command is transmitted to the network line connector SW1. The sounding stop command is to stop the buzzer 74 during the sounding time.

When the administration screen is displayed on the WEB browser of the administration computer PC, a user inputs the sounding time in the input box 102 and enters a buzzer sounding instruction by clicking the execution button 104 (Operation O130). On receiving this instruction, the administration computer PC transmits a command for sounding the buzzer 74 to the network device SW1 (Step S260).

When the CPU 50 of the network device SW1 receives the buzzer sounding command as a process of the receiving unit 51 (Step S350), the CPU 50 sounds the buzzer 74 for the specified period of time as a process of the location notifying unit 52, and notifies the installation location of the network device SW1 by flashing the loop display LED 72 (Step S360). The sounding the buzzer 74 and the flashing loop display LED 72 may be generated at the same time or at different timings.

After the buzzer is sounded, the CPU 50 determines whether the buzzer sounding stop condition is met (Step S370). The buzzer sounding stop condition in the present embodiment is whether the sounding time included in the buzzer sounding command received from the administration computer PC elapses or whether a sounding stop command is received from the administration computer PC. If either of elapse of the sounding time or receiving of the sounding stop command is met, it means that the buzzer sounding stop condition is met.

As a result, if the buzzer sounding stop condition is not met (Step S370: NO), the CPU 50 stands by until the buzzer sounding stop condition is met while continuing to sound the buzzer. On the other hand, if the buzzer sounding stop condition is met (Step S370: YES), the CPU 50 stops the buzzer, and turns off the loop display LED 72 (Step S380). Accordingly, the search process of the network device is completed. In the present embodiment, in Step S360, the installation location of the network device SW1 is notified by the buzzer 74 and the loop display LED 72, but the indication may include only one thereof.

The network device SW1 sounds the buzzer 74 in response to the buzzer sounding instruction transmitted from the administration computer PC and flashes the loop display LED 72 to notify the installation location of the network device SW1. Accordingly, a user can easily specify the installation location of the network device SW1. Since the installation location is also audibly notified by the buzzer 74, the installation location can be easily specified even in a case where the network device is installed in a less visible location such as under a floor. In addition, since the installation location is visibly notified by the loop display LED 72, the installation location can be easily specified even under a situation that it is difficult to distinguish the network device only by the audible indication, for example, when a plurality of network devices are collectively installed.

The network device SW1 responds, along with an IP address of the network device SW1, to the search command for a network device transmitted by the administration computer PC. Consequently, the user can select the network device SW1 among the network devices SW1 through SW3 of which the administration computer PC receives the responses, and can input an instruction for sounding the buzzer 74 of the network device SW1.

In addition, the network device SW1 outputs the administration screen data to allow the input of the instruction for notify the location of the network device SW1 and transmits the administration screen data to the network device SW1 as a response to the http request from the WEB browser of the administration computer PC. Consequently, the user can easily input the instruction to the network device SW1 by operating the corresponding administration screen.

C. Embodiment 3

Figure 9:
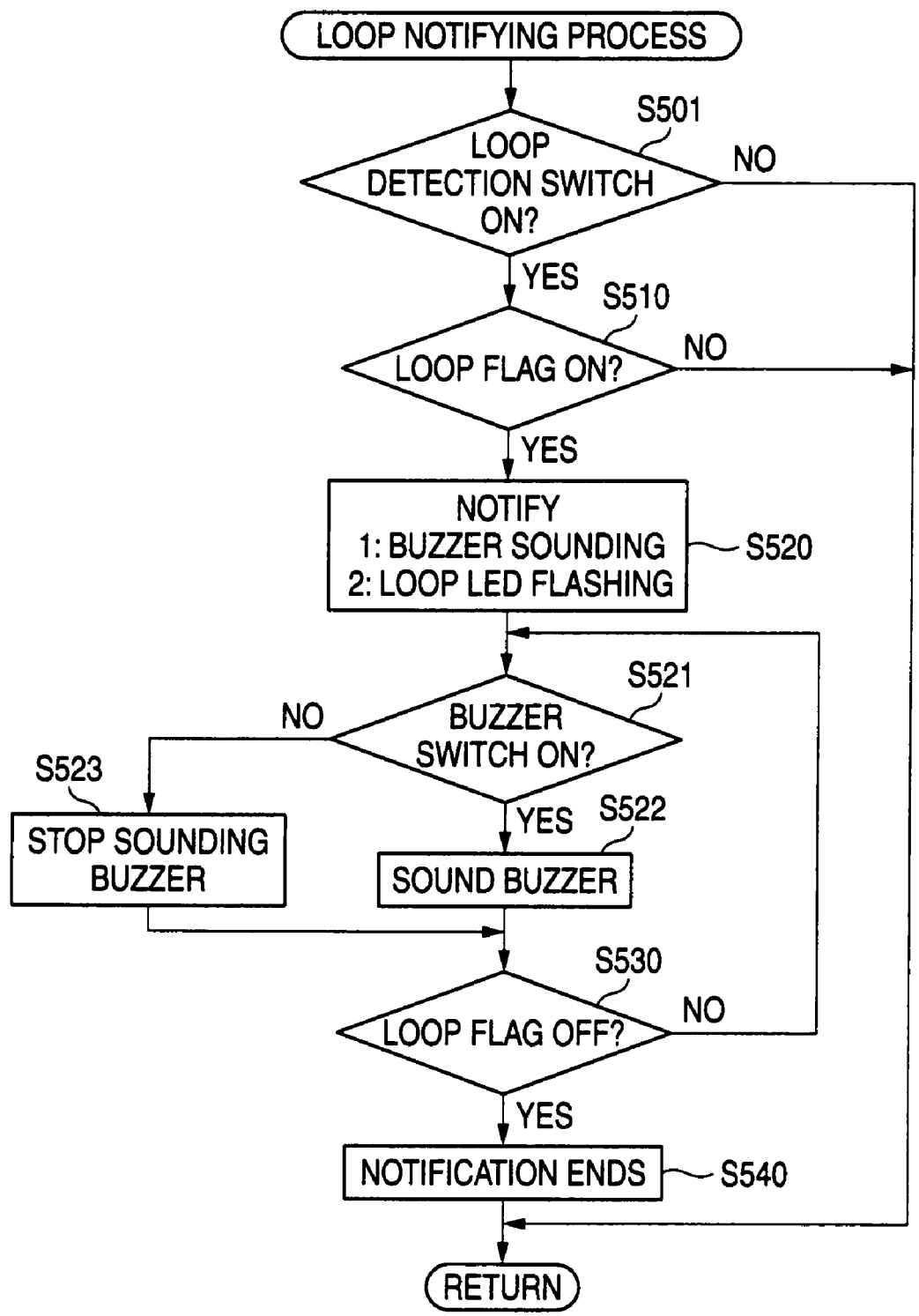
FIG. 9 is a flowchart showing a flow of a loop notifying process according to the embodiment 3.
Figure 10:
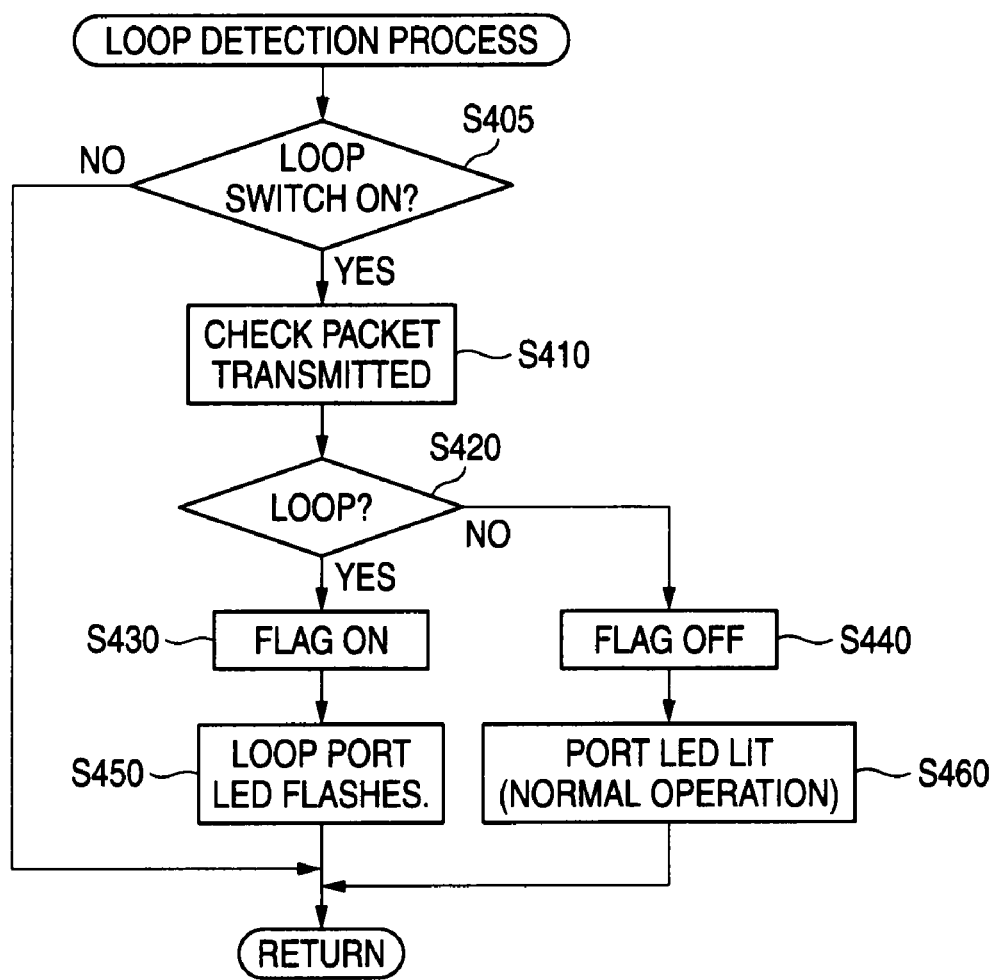
FIG. 10 is a flowchart showing a flow of a loop detecting process according to the embodiment 3.

Next, an embodiment 3 of the invention is hereinafter described with reference to FIGS. 8 to 10. In the embodiment 3, similar or identical elements and operations in connection with the embodiments 1 and 2 are denoted by identical reference symbols, and the description thereof is omitted in this embodiment.

Figure 8:
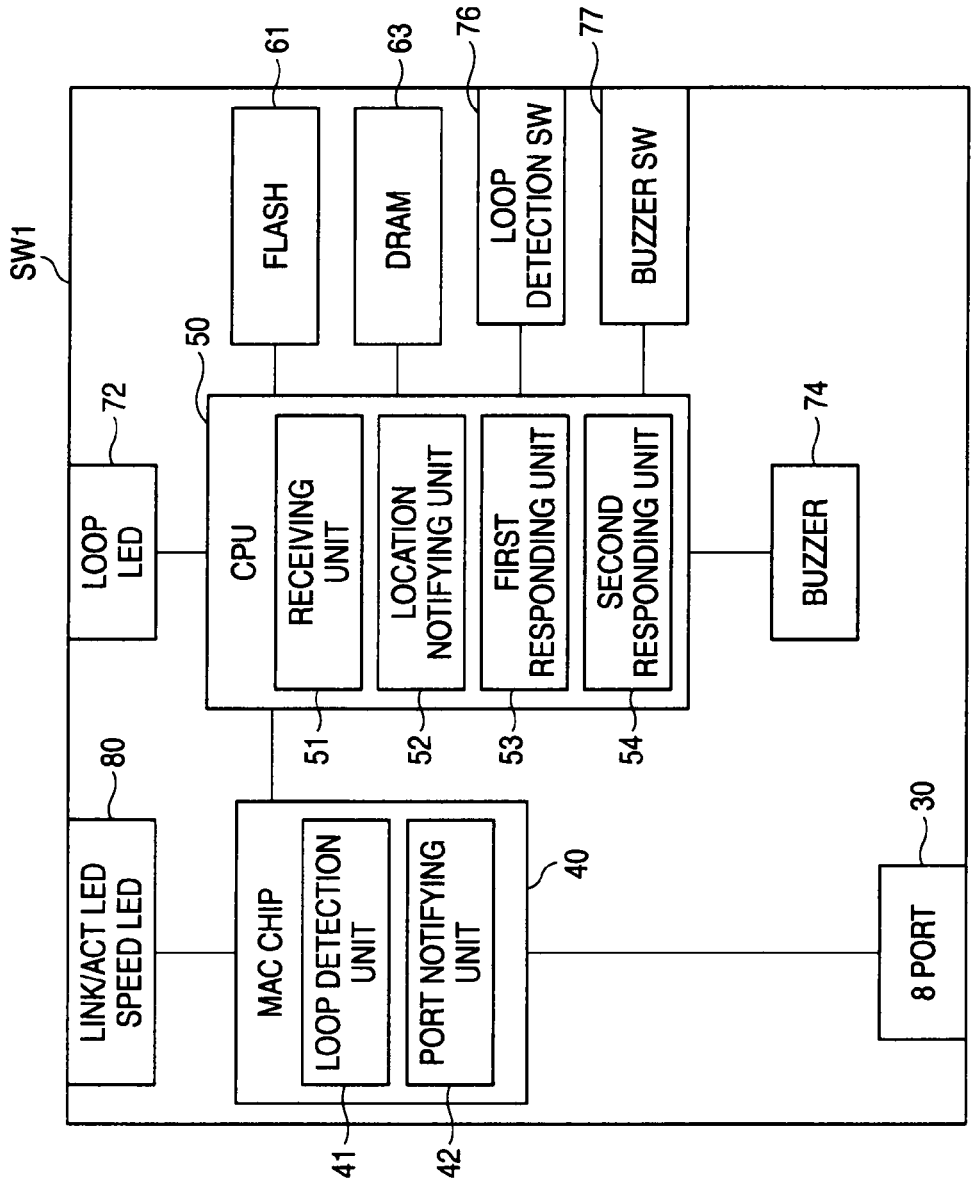
FIG. 8 is a schematic view showing a brief configuration of a network device according to an embodiment 3.

As shown in FIG. 8, a network device SW1 of this embodiment includes a loop detection switch 76 and a buzzer switch 77. The loop detection switch 76 and the buzzer switch 77 are connected to the CPU 50.

The loop detection switch 76 is provided for selecting whether to execute a loop detection process. In other words, the loop detection switch 76 is configured to receive an instruction whether to execute a loop detection process. Specifically, if the loop detection switch 76 is set ON, the loop detection process is executed. On the other hand, the loop detection switch 76 is set OFF, the loop detection process is not executed. More specifically, for example, the CPU 50 activates or deactivates the loop detection unit 41 in response to the selected state of the loop detection switch 76.

The buzzer switch 77 is provided for selecting whether to sound the buzzer 74. In other words, the buzzer switch 77 is configured to receive an instruction whether to allow the buzzer 74 to sound. Specifically, if the buzzer switch 77 is set ON, the sounding of the buzzer 74 is allowed. On the other hand, if the buzzer switch is set OFF, the sounding of the buzzer 74 is prohibited. More specifically, for example, the CPU 50 activates or deactivates the buzzer 74 in response to the selected state of the buzzer switch 77.

Each of the loop detection switch 76 and the buzzer detection switch 77 includes a slidable switch which is slidable between an ON position and an OFF position and is connected to the CPU 50.

Consequently, the user can select whether to execute the loop detection and/or whether to sound the buzzer 74 through the ON/OFF selection operation to the loop detection switch 76 and/or the buzzer switch 77 in accordance with usage status of the network device SW1.

Although the above-described loop detection switch 76 and buzzer switch 77 include slidable switches, the type of the switches is not limited thereto. For example, a toggle switch or a push button switch may be applicable. Further, the network device SW1 may include a single switch having functions of both the loop detection switch 76 and the buzzer switch 77.

Although FIG. 8 shows the loop detection switch 76 and the buzzer switch 77 both connected to the CPU 50, at least one of the switches 76 and 77 may be connected to the MAC chip 40 instead of the CPU 50.

The timing for detecting the selected state of the loop detection switch 76 and the buzzer switch 77 is not limited to a specific timing but a given timing. For example, the CPU 50 may detect the state (e.g., ON state) of the loop detection switch 76 and/or the buzzer switch 77, only when the network device SW1 is turned on, or only during a given time period after the network device SW1 is turned ON.

A loop notifying process according to the embodiment 3 is hereinafter described with reference to FIG. 9. When the loop notifying process is initiated, the CPU 50 of the network device SW1 determines whether the loop detection switch 76 is set ON (Step S501). If the loop detection switch 76 is set OFF (Step S501: NO), the CPU 50 returns the loop notifying process since it means that the user is not willing to detect the loop.

If the loop detection switch 76 is ON (Step S501: YES), the CPU 50 determines whether the loop flag is set ON (Step S510). If the loop flag is set ON, the CPU 50 sounds the buzzer 74 and blinks the loop display LED 72 (Step S520).

After Step S520, the CPU 50 determines whether the buzzer switch 77 is set ON (Step S521). If the buzzer switch 77 is set ON (Step S521: YES), the CPU 50 continues the sounding of the buzzer 74 (Step S522), since it means that the user is not willing to stop sounding the buzzer 74. If the buzzer switch 77 is set OFF (Step S521: NO), the CPU 50 stops the sounding of the buzzer 74 (Step S523), since it means that the user is not willing to stop sounding the buzzer 74. At Step S523, although the sounding of the buzzer is stopped, the CPU 50 continuously executes the blinking of the loop display LED 72 and the loop port display of the link/act LEDs 81-88. However, the execution of the displays of LEDs 72 and 81-88 may be stopped along with the stop of the sounding of the buzzer 74.

After Step S522 or S523, the CPU 50 determines again whether the loop flag is set OFF (Step S530). If the loop flag is set ON (Step S530: NO), it means that the loop is not cleared yet. Accordingly, the CPU 50 returns the process to Step S521. On the other hand, if the loop flag is set OFF (Step S530: YES), it means that the loop is cleared. Accordingly, the CPU 50 terminates the notifying process of Step S520 (Step S540), and returns the process.

A loop detection process according to the embodiment 3 is hereinafter described with reference to FIG. 10. When the loop detection process is initiated, the CPU 50 determines whether the loop detection switch 76 is ON (Step S405). If the loop detection switch 76 is OFF (Step S405: NO), the CPU 50 terminates the loop detection process, since it means that the user is not willing to detect the loop. If the loop detection switch 76 is ON (Step S405: YES), the CPU 50 executes the processes of Steps S410-S460 similar to the embodiment 1.

When the detection of the loop detection switch 76 is performed only when the network device SW1 is turned ON or only during the given time period after from the turn ON of the network device SW1, if it is once determined in Step S405 that the loop detection switch 76 is set OFF, the loop detection process is not performed until the network device SW1 is powered OFF and then powered ON again. In other words, even when the loop detection switch 76 is operated to switch the loop detection from OFF to ON after the turn ON of the network device SW1 or the given time period, the switching operation from OFF to ON of the loop detection is not immediately detected but first detected at a time after the network device SW1 is powered OFF and then powered ON again. For example, when the network device SW1 is turned ON, the ON/OFF state of the loop detection switch 76 is detected (step S405), and the detected state is stored in a nonvolatile memory such as the flash memory 61. If the loop detection switch 76 is OFF, one execution of the loop detection process (the first execution of the loop detection process after the network device SW1 is powered ON) is completed. Otherwise (step S405: NO), steps S410-S460 are executed, and then the first execution of the loop detection process is completed. Thereafter, in the second and subsequent executions of the loop detection process, step S405 is skipped, and instead, the ON/OFF state of the loop detection switch 76 is read from the memory. That is, if the state "OFF" of the loop detection switch 76 is stored in the memory at the first execution of the loop detection process, all the steps in the loop detection process is not performed in the second and subsequent executions of the loop detection process. If the state "ON" of the loop detection switch 76 is stored in the memory at the first execution of the loop detection process, steps S410-S460 are executed in the second and subsequent executions of the loop detection process.

Further, when the loop detection switch 76 and the buzzer switch 77 are shared by one switch, the operation of the one switch during a given time period after the turn ON of the network device SW1 may be valid as the operation of the loop detection switch 76 but invalid as the operation of the buzzer switch 77, and the operation of the one switch after the given time period may be in valid as the operation of the loop detection switch 76 but valid as the operation of the buzzer switch 77.

The network device SW1 of this embodiment includes the loop detection switch 76, which can select whether to perform the loop detection according to the user's purpose. Therefore, since the network device SW1 does not perform the loop detection process in a case in which the loop detection process is unnecessary, the load in the network can be reduced according to the user's direction.

Further, the network device SW1 of this embodiment includes the buzzer switch 77, which can select whether to sound the buzzer 74 during the loop detection according to the user's purpose. Therefore, the unnecessary noise caused by the buzzer 74 can be avoided. For example, when the user finds the network device SW1 causing the loop and then switches the buzzer switch 77 to OFF, the buzzer 74 does not sound thereafter (e.g., during loop clearing work), the unnecessary noise is not generated. Further, since the buzzer switch 77 is provided at the network device SW1, even when the user arrives at the location of the network device SW1, the user can easily stop the sounding of the buzzer 74 on site.

In the loop detection process of the network device SW1 of this embodiment, even when the user turns OFF the buzzer switch 77, the loop display LED 72 continues to brink, and the link/act LED portion 81-88 displays a loop port. Therefore, even when the buzzer switch 77 is turned OFF immediately after the user finds the network device SW1 causing the loop, the user can grasp a loop generation state according to the loop display LED 72 and the link/act LEDs 81-88, which facilitates the loop clearing work.

Various modifications of the above-described embodiments are described hereinafter.

D. Modifications

D-1. Modification 1

Although the above-described embodiments the network device SW1 includes the buzzer 74 as an example of a notifier, the notifier is not limited thereto, and the network device SW1 may generate various types of sounds. For example, the network device SW1 may include an acoustic output device, such as a speaker which may reproduce music and sounds stored in a flash memory 61, etc.

Also, the volume of the sound generated by the notifier may be gradually increased in line with the elapse of time. The volume of sounds of the notifier may be set through the administration screen shown in FIG. 7, and sound volume information may be included in a command transmitted by the administration computer PC in Step S260 of FIG. 6. Consequently, sound may be generated at an optimal volume level depending on the noise level of the installation environment of the network device SW1.

D-2. Modification 2

Although the network device SW1 notifies the installation location and the port contributing to the loop by flashing an LED in the embodiments, the notifier is not limited thereto, and the network device SW1 may carry out various types of display by the device. In other words, the network device SW1 may control the LED in a given lighting pattern. For example, instead of the flashing, the LED may be continuously lit, or may be turned off but lit or flashing in a normal state. Further, the notifier is not limited to the LED, and various types of light emitting devices such as a lighting tube or a bulb may be lit, flashed or turned off. Further, a display color may be changed. Of course, it is not necessary that the notifier is limited to a light emitting device. For example, the network device SW1 may include a display gauge varied by using an actuator or may include a display configured to display characters.

D-3. Modification 3

In the embodiment 2, a predetermined instruction is transmitted to the network device SW1 from the administration computer PC via the local area network LAN, and the buzzer 74 is sounded and the loop display LED 72 is flashed. However, the predetermined instruction is not limited to a given via a network, and an instruction may be given from an outside of the network device SW1. For example, the network device SW1 may be equipped with a remote controller, and the user may give the instruction to the network device SW1 by emitting infrared rays and electric waves from the remote controller.

D-4. Modification 4

In the Embodiments 1 and 3, the MAC chip 40 periodically detects a loop, but it is not limited thereto. For example, the port portion 30 may include a connection recognition circuit of a cable, and a loop check may be carried out when recognizing a new connection, in addition to the periodical loop detection. Also, the interval of loop detection may be changed to shorten within a predetermined period of time since a new connection is recognized. In this case, since the network device SW1 can quickly notify of an incorrect connection when a user carries out an incorrect connection that causes a loop, the user can easily recognize the erroneous connection.

D-5. Modification 5

In the Embodiment 3, the network device SW1 includes a hardware configuration such as the loop detection switch 76 and the buzzer switch 77 so as to select whether to allow the execution of the loop detection process and whether to allow the sounding of the buzzer 74. However, the present invention is not limited thereto, and the selection of at least one of the execution of loop detection and the sounding of the buzzer 74 may be selected by a software configuration. For example, the buzzer switch 77 may include a toggle switch. In this case, every time the toggle switch is pushed, the toggle switch outputs a signal to the CPU 50, and the CPU 50 switches the ON/OFF of the execution of the loop detection in response to the signal sent from the toggle switch. Further, the network device SW1 (the CPU 50) may switch the execution of the loop detection and/or the sounding of the buzzer 74 in response to a signal sent from an external device via a network or a signal sent from a remote controller, instead of or in addition to the configuration of Embodiment 3. That is, the network device SW1 may include a unit to receive an instruction to select ON/OFF of the execution of the loop detection and/or a unit to receive an instruction to select ON/OFF the sounding of the buzzer 74. In other words, the network device SW1 can provide the switching function as long as the network device SW1 includes a receiving unit configured to receive an instruction to select whether to execute the loop detection and/or an instruction to select whether to sound the buzzer 74.

When the network device SW1 selects ON/OFF by way of software, a default setting for the loop detection and the sounding of the buzzer 74 may be ON during the time period that the network device SW1 is powered ON. Instead, the CPU 50 may select ON/OFF in accordance with a given event such as an elapse of a given time period. Accordingly, even if the user turns OFF the sounding of the buzzer 74 during the loop clearing work and then leaves the setting OFF (i.e., forgets to return the setting to ON), the network device SW1 can sound the buzzer 74 in response to the detection of the loop next time, which facilitates the loop clearing work.

D-6. Modification 6

In the embodiments, the switching hub is explained as an example of the network device. However, as various network devices may be adopted, such as a bridge, and a layer 2 switch, which carry out exchange of frames in a data link layer. Of course, the present invention is not limited to a network device for carrying out exchange of frames in a data link layer, and the present invention may be embodied as various types of network devices incorporating an exchange feature of data such as a switching router and a layer 3 switch for exchange in a network layer, and a layer 4 switch for switching in a transporting layer.

D-7. Modification 7

The embodiments shows a network device as an example. The present invention is not limited to the network device but may be embodied as a notification device connected to the network device. For example, the notification device includes a loop display LED 72, a buzzer 74 and a CPU functioning as a function unit shown in the embodiment may be connected to the CPU of a network device via a port connected by GPIO (General Purpose I/O). Accordingly, a general-purpose network device can obtain effects and advantages similar to those of the network device SW1 shown in the embodiments.

The above-described embodiments of the invention can provide the following aspects.

(1) A network device comprises: a loop detecting unit configured to detect a loop caused by said network device; and a location notifying unit configured to allow said network device itself to indicate a location of said network device in response to a detection of the loop.

Since the network device itself notifies the installation location itself where existence of a loop is detected, it is possible to easily specify the installation location of the network device in which a loop occurs. Therefore, a loop clearing work can be quickly carried out.

(2) The network device of (1) may further comprise a notifier configured to output at least one of a visible indication and an audible indication in response to the detection of the loop. Accordingly, it is possible to easily specify a network device causing the loop even when the network device is located at a less-visible place, or a plurality of network devices are collectively installed.

(3) In the network device of (2), the notifier may comprise a buzzer, and the location notifying unit may sound a buzzer in response to the detection of the loop.

Since the network device notifies of the installation location of the network device by sounding a buzzer when detecting existence of a loop, the network device that generates a loop can be easily specified even when the network device is installed in a less visible location such as below the floor, etc. Therefore, a loop clearing work can be quickly carried out.

(4) The network device of (2) or (3) may comprise a notification instruction receiving unit configured, when the notifier is configured to output the audible indication, to receive a switching instruction to select whether to output the audible indication.

The network device can select whether to output the audible indication, e.g., whether to sound the buzzer, in accordance with an input (instruction) of the selection. Therefore, the noise caused by the audible indication can be prevented.

(5) In the network device of (4), the notification control unit may comprise a manual switch manually operable to select whether to output the audible indication.

Since the network device receives the switching instruction through the operation of the manual switch, even when the user arrives at the location of the network device, the user can easily stop sounding the audible indication on site.

(6) In the network device of any of (2) to (5), the notifier may comprise a light emitting diode, and the location notifying unit may light or flash the light emitting diode in response to the detection of the loop.

Since the network device notifies the installation location of the network device by lighting or flashing the LED when detecting existence of a loop, the network device generating a loop can be easily specified even when a plurality of network devices are collectively installed. Therefore, a loop clearing work can be quickly carried out.

(7) The network device of any of (1) to (6) may further comprises: a plurality of ports connectable to a network; and a port notifying unit. The loop detecting unit may comprise a port specifying unit configured to specify a port of the plurality of ports which contributes to the loop. The port notifying unit may allow the network device itself to indicate the port contributing to the loop.

Since the network device itself notifies a port contributing to the loop when detecting existence of a loop, the port contributing to the loop can be easily specified, and a loop clearing work can be quickly carried out.

(8) In the network device according to any of (1) to (7) may further comprise a detection instruction receiving unit configured to receive a detection instruction to select whether the loop detection unit executes a detection of the loop.

Since the network device SW1 does not perform the loop detection process in a case in which the loop detection process is unnecessary, the load in the network can be reduced according to the user's direction.

(9) A network device for exchanging data via a network includes a receiving unit configured to receive a predetermined instructions from an outside of the network device; and location notifying unit configured to allow said network device itself to indicate a location of the network device.

The network device itself can notify (indicate) an installation location of the network device based on the predetermined instruction from an outside. Accordingly, it is possible to easily specify the installation location of the network device. The notification of the network device itself includes various types of sounds generated by the network device and various types of display generated by the network device itself. In other words, the network device also directly notifies the user of the location thereof. In still other words, the network device generates a human-sensible indication in response to the instruction.

(10) The network device of (9) may further comprises a notifier configured to output at least one of a visible indication and an audible indication in response to the instruction. Accordingly, it is possible to easily specify a desired network device even when the network device is located at a less-visible place, or a plurality of network devices are collectively installed.

(11) In the network device of (10), the notifier may comprise a buzzer, and the location notifying unit may sound the buzzer in response to the instruction.

Since the network device notifies the installation location thereof by sounding the buzzer, the installation location thereof can be easily specified even in a case where the network device is installed in a less visible location such as below the floor, etc.

(12) In the network device of (10) or (11), the notifier may comprise a light emitting diode, and the location notifying unit may light or flash the light emitting diode in response to the instruction.

Since the network device notifies the installation location of the network device by lighting and flashing the LED, it is possible to easily specify a desired network device even in a case where a plurality of network devices are collectively installed.

(13) In the network device of any of (9) to (12), the receiving unit may be connectable to a network, and the network device may further comprise a first responding unit configured to send identification information assigned to said network device in response to a search command received by the receiving unit via the network.

Since the network device makes a response of existence of itself to a command for searching a network device, a user can select a desired network device among the network devices that have responded, and the user can give it the predetermined instruction. Therefore, the user can easily give the predetermined instruction to the desired network device.

(14) In the network device of any of (9) to (13), the receiving unit may be connectable to a network, and the network device may further comprise a second responding unit configured, in response to a transmission request from a WEB browser received by the receiving unit via the network, to output screen data for displaying a screen operable by a WEB browser.

Since the network device outputs the screen data for inputting the predetermined instruction in response to a transmission request of the WEB browser, a user can operate the corresponding screen on the WEB browser, and easily give the predetermined instruction to the network device.

Also, the embodiments of the invention may provide a network system shown in the following items (15), methods shown in the following items (16) and (17) and notification devices shown in the following items (18) and (19).

(15) A network system comprises: a computer; and a network device connected to the computer via a network. The computer comprises: a transmission unit configured to transmit a predetermined instruction to the network device via the network. The network device includes: a receiving unit configured to receive the predetermined instructions transmitted by the computer; and a location notifying unit configured to allow the network device itself to indicate a location of the network device in response to the predetermined instruction received by the receiving unit.

(16) A method for specifying a location of a network device connected to a network, the method comprises: detect a loop caused by said network device; and allowing said network device itself to indicate a location of said network device in response to a detection of the loop.

(17) A method for specifying a location of a network device connected to a network, said method comprises: receiving a predetermined instruction from an outside of said network device; and allowing said network device itself to indicate a location of said network device in response to the instruction.

(18) A notification device connectable to a network device, said notification device comprises: a loop detecting unit configured to detect a loop caused by the network device; and a location notifying unit configured to allow the notification device itself to indicate a location of said network device in response to a detection of the loop.

(19) A notification device connectable to a network device, said notification device comprises: a receiving unit configured to receive a predetermined instruction received from an outside of said network device via the network device; and a location notifying unit configured to allow said notification device itself to indicate a location of said network device in response to the instruction.

Although the above description is given of the embodiments of the present invention, the present invention is not limited to the above embodiments. It is a matter of course that the present invention may be embodied in various modes within the scope not departing from the spirit of the present invention. For example, the present invention may be embodied as a network system equipped with network devices and as a method for specifying an installation position of network devices in addition to the above-described network devices.

What is claimed is:
1. A network device comprising:
 a chip configured to detect a loop caused by the network device in which a frame permanently circulates between the network device and at least one other network device;

a processor configured to control the network device to indicate a location of the network device in response to a detection of the loop;

a plurality of ports connectable to a network; and a circuit configured to recognize a new connection to one of the ports, wherein the chip is configured to perform a loop detecting process of detecting the loop iteratively at a first time interval, and perform the loop detecting process at a second time interval that is shorter than the first time interval for a predetermined time period from recognizing the new connection.

2. The network device according to claim 1, further comprising:

a notifier configured to output at least one of a visible indication and an audible indication in response to the detection of the loop.

3. The network device according to claim 2, wherein the notifier comprises a buzzer, and the processor is configured to control the buzzer to sound in response to the detection of the loop.

4. The network device according to claim 2, further comprising:

an interface configured to receive a switching instruction to select whether to output the audible indication when the notifier is configured to output the audible indication.

5. The network device according to claim 4, wherein the interface includes a manual switch manually operable to select whether to output the audible indication.

6. The network device according to claim 2, wherein the notifier comprises a light emitting diode, and the processor is configured to control the light emitting diode to light or flash in response to the detection of the loop.

7. The network device according to claim 2, wherein the chip is configured to specify a port of the plurality of ports which contributes to the loop, and control the network device to indicate the port contributing to the loop.

8. The network device according to claim 1, further comprising:

an interface configured to receive a detection instruction to select whether the chip executes a detection of the loop.

9. A method for specifying a location of a network device connected to a network, the method comprising:

detecting a loop caused by the network device in which a frame permanently circulates between the network device and at least one other network device;

indicating, by the network device, location of the network device in response to a detection of the loop; and recognizing a new connection to one of a plurality of ports of the network device that are connectable to a network, wherein the detecting includes a loop detecting process of detecting the loop iteratively at a first time interval, and the loop detecting process is performed at a second time interval that is shorter than the first time interval for a predetermined time period from recognizing the new connection.

10. A notification device connectable to a network device including a plurality of ports connectable to a network, the notification device comprising:

a chip configured to detect a loop caused by the network device in which a frame permanently circulates between the network device and at least one other network device;

a processor configured to control the notification device to indicate a location of the network device in response to a detection of the loop; and a circuit configured to recognize a new connection to one of the ports, wherein the chip is configured to perform a loop detecting process of detecting the loop iteratively at a first time interval, and perform the loop detecting process at a second time interval that is shorter than the first time interval for a predetermined time period from recognizing the new connection.

11. The network device according to claim 1, wherein the chip is configured to broadcast a loop check packet through the plurality of ports, and detect the loop when the check packet is returned within a predetermined time period.

12. The network device according to claim 1, wherein the chip is configured to perform a loop detecting process for detecting the loop in response to recognizing the new connection.

* * * * *